United States Patent
Ernst et al.

(10) Patent No.: US 12,188,431 B2
(45) Date of Patent: Jan. 7, 2025

(54) WASTE HEAT RECOVERY LUBE OIL MANAGEMENT

(71) Applicant: CUMMINS INC., Columbus, IN (US)

(72) Inventors: Timothy C. Ernst, Columbus, IN (US); Jared Carpenter Delahanty, Morgantown, IN (US); Nathan Thomas Honican, North Vernon, IN (US)

(73) Assignee: Cummins Inc., Columbus, IN (US)

( * ) Notice: Subject to any disclaimer, the term of this patent is extended or adjusted under 35 U.S.C. 154(b) by 477 days.

(21) Appl. No.: 17/481,863

(22) Filed: Sep. 22, 2021

(65) Prior Publication Data
US 2022/0316425 A1 Oct. 6, 2022

Related U.S. Application Data

(62) Division of application No. 17/222,558, filed on Apr. 5, 2021, now Pat. No. 11,187,185.

(51) Int. Cl.
*F02G 5/04* (2006.01)
*F01N 5/02* (2006.01)

(52) U.S. Cl.
CPC ............... *F02G 5/04* (2013.01); *F01N 5/02* (2013.01); *F02G 2253/00* (2013.01); *F02G 2254/15* (2013.01)

(58) Field of Classification Search
CPC .... F02G 5/04; F02G 2253/00; F02G 2254/15; F01N 5/02
See application file for complete search history.

(56) References Cited

U.S. PATENT DOCUMENTS

| | | |
|---|---|---|
| 3,378,104 A | 4/1968 | Venable |
| 4,051,680 A | 10/1977 | Hall |
| 4,164,850 A | 8/1979 | Lowi, Jr. |
| 4,352,270 A | 10/1982 | Silvestri, Jr. |
| 5,165,248 A | 11/1992 | Sishtla |
| 5,749,227 A | 5/1998 | Smith et al. |
| 6,237,322 B1 | 5/2001 | Rago |
| 8,733,096 B2 | 5/2014 | Loidl |
| 8,800,285 B2 | 8/2014 | Ernst et al. |
| 9,845,711 B2 | 12/2017 | Ernst et al. |

(Continued)

FOREIGN PATENT DOCUMENTS

WO WO-2014117156 A1 * 7/2014 .......... F01K 21/005

OTHER PUBLICATIONS

US Notice of Allowance for U.S. Appl. No. 17/222,558, dated Aug. 5, 2021.

*Primary Examiner* — Audrey B. Walter
(74) *Attorney, Agent, or Firm* — Foley & Lardner LLP

(57) ABSTRACT

A waste heat recovery system comprising a thermal circuit. The thermal circuit includes a boiler and an expander fluidly coupled to the boiler. The thermal circuit further includes a power transfer system integrated to the expander. The power transfer system is configured to receive mechanical energy from the expander. The thermal circuit further includes an ejector fluidly coupled to the boiler and to the power transfer system. The ejector is configured to receive a motive flow of working fluid from the boiler. The ejector is further configured to receive a suction flow of working fluid from the power transfer system. The ejector is further configured to combine the motive flow of working fluid and the suction flow of working fluid.

20 Claims, 5 Drawing Sheets

(56) References Cited

U.S. PATENT DOCUMENTS

| | | |
|---|---|---|
| 10,087,800 B2 | 10/2018 | Fukami et al. |
| 2002/0166317 A1 | 11/2002 | Przytulski et al. |
| 2003/0097872 A1 | 5/2003 | Granitz et al. |
| 2004/0144093 A1 | 7/2004 | Hanna et al. |
| 2006/0112693 A1 | 6/2006 | Sundel |
| 2009/0188253 A1 | 7/2009 | Smith et al. |
| 2010/0186410 A1 | 7/2010 | Cogswell et al. |
| 2010/0205966 A1 | 8/2010 | Matteson et al. |
| 2011/0005237 A1 | 1/2011 | Matteson et al. |
| 2013/0133326 A1 | 5/2013 | Jonsson et al. |
| 2014/0090405 A1 | 4/2014 | Held et al. |
| 2014/0345274 A1 | 11/2014 | Ernst et al. |
| 2016/0003510 A1 | 1/2016 | De Larminat et al. |
| 2016/0265815 A1 | 9/2016 | Snell et al. |
| 2016/0369886 A1 | 12/2016 | Sterns |
| 2017/0058707 A1 | 3/2017 | Juretzek |
| 2017/0058708 A1 | 3/2017 | Noureldin et al. |
| 2017/0059031 A1 | 3/2017 | Doertoluk et al. |
| 2018/0100410 A1 | 4/2018 | Moniz et al. |
| 2018/0313233 A1 | 11/2018 | Tateno |
| 2019/0048758 A1 | 2/2019 | Noureldin et al. |
| 2019/0128273 A1 | 5/2019 | Goldenberg |
| 2020/0088068 A1 | 3/2020 | Ernst et al. |

\* cited by examiner

WASTE HEAT RECOVERY LUBE OIL MANAGEMENT

CROSS-REFERENCE TO RELATED APPLICATIONS

This application is a divisional of U.S. patent application Ser. No. 17/222,558, filed on Apr. 5, 2021, the content of which is incorporated by reference in its entirety.

GOVERNMENT SUPPORT STATEMENT

This invention was made with government support under DE-EE0007761, awarded by the Department of Energy. The government has certain rights in this invention.

TECHNICAL FIELD

The present disclosure relates generally to a heat recovery system utilizing a gearbox, and more particularly, a waste heat recovery system coupled to a gearbox where motive flow is used to reduce gearbox pressure.

BACKGROUND

A Rankine cycle, such as an organic Rankine cycle, can be used to capture a portion of heat energy that normally would be wasted ("waste heat") and convert that portion of the captured heat energy into energy that can perform useful work. Systems utilizing a Rankine cycle are sometimes referred to as waste heat recovery (WEIR) systems. For example, heat from an internal combustion engine system, such as exhaust gas heat energy or other engine waste heat sources (e.g., engine oil, charge gas, engine block cooling jackets, etc.) can be captured and converted to useful energy (e.g., electrical and/or mechanical energy). In this way, a portion of the waste heat energy can be recovered to increase the efficiency of a system including one or more waste heat sources.

Additionally, a gearbox for a mechanical system typically relies on a balance of pressures to keep oil retained. These gearboxes may experience oil loss due to excess pressure, which can cause the mechanical system to fail.

SUMMARY

One embodiment relates to a waste heat recovery system comprising a thermal circuit. The thermal circuit includes a boiler and an expander fluidly coupled to the boiler. The thermal circuit further includes a power transfer system integrated to the expander. The power transfer system is configured to receive mechanical energy from the expander. The thermal circuit further includes an ejector fluidly coupled to the boiler and to the power transfer system. The ejector is configured to receive a motive flow of working fluid from the boiler. The ejector is further configured to receive a suction flow of working fluid from the power transfer system. The ejector is further configured to combine the motive flow of working fluid and the suction flow of working fluid.

Another embodiment relates to a waste heat recovery system comprising a thermal circuit configured to convert thermal energy into mechanical energy. The thermal circuit includes a boiler, an expander fluidly coupled to the boiler. The expander is configured to receive working fluid from the boiler. The thermal circuit further includes a power transfer system integrated to the expander. The power transfer system is configured to receive mechanical energy from the expander. The power transfer system has an interface configured to restrict movement of oil present in the power transfer system into the thermal circuit. The thermal circuit further includes a vapor flow conduit fluidly coupled to the boiler and configured to receive high-pressure vapor working fluid from the boiler. The vapor flow conduit is configured to provide high-pressure vapor working fluid proximate to the interface.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that the figures are schematic representations for purposes of illustration. The figures are provided for the purpose of illustrating one or more implementations with the explicit understanding that the figures will not be used to limit the scope or the meaning of the claims.

DETAILED DESCRIPTION

Following below are more detailed descriptions of various concepts related to, and implementations of, methods, apparatuses, and systems for waste heat recovery lube oil management. The methods, apparatuses, and systems introduced above and discussed in greater detail below may be implemented in various ways, as the described concepts are not limited to any particular manner of implementation. Examples of specific implementations and applications are provided primarily for illustrative purposes.

Figure 1:
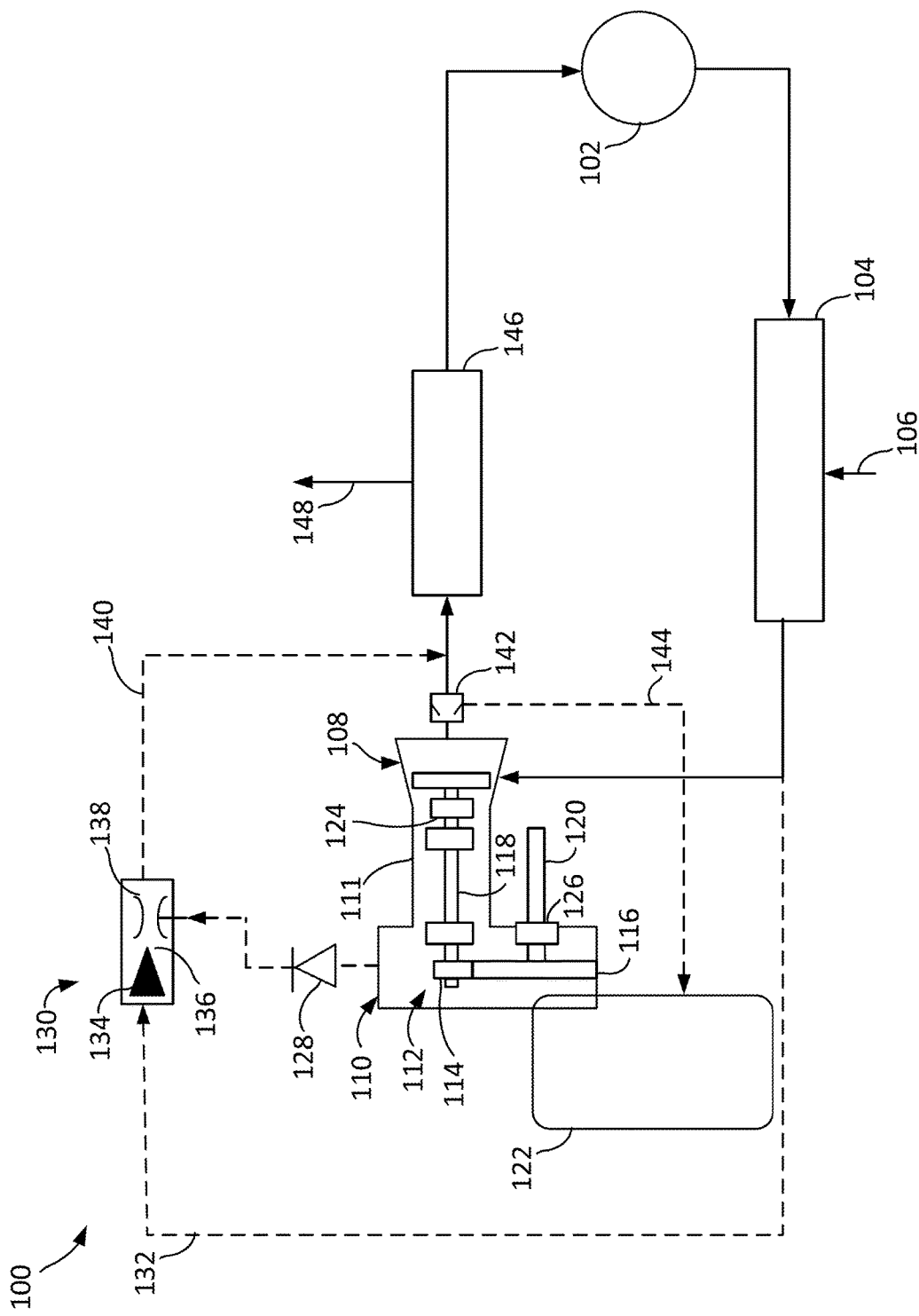
FIG. 1 is a diagram of an example waste heat recovery (WHR) system including an ejector.

FIG. 1 is a diagram of an example waste heat recovery (WHR) system 100 including an ejector according to an exemplary embodiment. The WHR system 100 includes a Rankine cycle, which can increase the thermal efficiency of an internal combustion engine (e.g., a gasoline or diesel engine system) by utilizing internal combustion exhaust gas heat energy and/or heat energy generated by an exhaust aftertreatment system. More specifically, the WHR system 100 includes a pump 102 (e.g., a feed or liquid pump, etc.) configured to move working fluid through a thermal circuit that includes a boiler, a high-pressure expander, (e.g., turbine, energy converter, etc.), and a condenser. The pump, the boiler, the high-pressure expander, and the condenser are fluidly coupled to each another and are configured to provide working fluid to or receive working fluid from each other to form a Rankine cycle thermal circuit.

The working fluid can be an organic working fluid, such as Genetron™ R-245fa from Honeywell, Solstice™ R-1233zd(E) from Honeywell Therminol™, Dowtherm J from the Dow Chemical Co., Fluorinol, Toluene, dodecane, isododecane, methylundecane, neopentane, octane, or water/methanol mixtures, or steam in a non-organic Rankine cycle embodiment, for example.

The WHR system 100 includes a boiler 104 (e.g., superheater, etc.) that is fluidly coupled to the pump 102 and configured to receive working fluid from the pump 102. The boiler 104 is configured to receive a thermal input 106 from a waste heat source (e.g. coolant, charge air, oil, aftertreatment exhaust, exhaust gas recirculation (EGR), thermal energy recuperator for the thermal circuit etc.). The heat provided by the thermal input 106 is transferred to the working fluid flowing through and/or near the boiler 104. The thermal transfer causes the working fluid to undergo boiling (e.g., rapid vaporization, etc.) and to transition into a high pressure vapor.

The WHR system 100 also includes an expander 108. The expander 108 may be a turbine, piston, scroll, screw, vane, swash plate, or other type of gas expander with mobile components, (e.g., rotates, as a result of expanding working fluid vapor to provide additional work, etc.). The expander 108 is fluidly coupled to the boiler 104 and is configured to receive high pressure vapor from the boiler 104. The expander 108 converts the energy of the high pressure vapor into another useful form of energy to provide the additional work.

The additional work produced by the expander 108 can be fed into the engine's driveline to supplement the engine's power either mechanically, hydraulically, or electrically (e.g., by turning a generator, etc.), or it can be used to drive a generator and power electrical devices, parasitics, or a storage battery. Alternatively, the expander 108 can be used to transfer energy from one system to another system (e.g., to transfer heat energy from the WHR system 100 to another engine system requiring shaft work, such as a compressor, alternator, A/C compressor, etc., or to a fluid for a heating system).

In an exemplary embodiment, the expander 108 is integrated into a power transfer system, in the form of a gearbox 110 (e.g., transmission, etc.) in a particular set of embodiments. Power produced by the expander 108 is capable of producing additional work or transferring energy to the gearbox 110. The gearbox 110 includes a gearbox housing 111 (e.g., manifold, encasing, etc.) The gearbox housing 111 defines a cavity to contain oil. The gearbox 110 includes a gearbox assembly 112 (e.g., transmission, etc.). Power that is generated by the expander 108 is mechanically coupled (e.g., integrated, etc.) to the gearbox assembly 112, which in turn is mechanically fed to a driveline (not shown) to supplement engine power and improve fuel economy. The power output of the expander 108 also can be used to perform other mechanical or electrical work, such as, for example, turning a generator, power electrical devices, parasitics, charge a storage battery, or transfer energy from system to another system (e.g., to transfer heat energy from WEIR system 100 to a fluid for a heating system).

The gearbox assembly 112 includes a first gear 114 and a second gear 116 respectively attached to an input shaft 118 and an output shaft 120, associated bearing assemblies (not shown), and an oil reservoir 122 that is in fluid communication with the gearbox 110. The input shaft 118 is mechanically coupled and operatively coupled to the output shaft 120. The rotational speed of the output shaft 120 is reduced relative to the rotational speed of input shaft 118, and the torque at the output shaft 120 is increased relative to the torque at the input shaft 118 in a manner corresponding to a reduction ratio of the gearbox assembly 112. It should be understood that the gearbox assembly 112 can include a different number of gears than what is depicted in the figures herein and a different output to input ratio corresponding to a particular application of the converted power.

In an example embodiment, the oil reservoir 122 is shown as laterally adjacent to the gearbox assembly 112. In other embodiments, the oil reservoir 122 can be located in another position. For example, the oil reservoir 122 can be positioned beneath the gearbox 110 so that escaped oil is collected within the oil reservoir 122. The gearbox 110 may also include collectors (e.g. scrapers, etc.) (not shown) positioned on the walls of the gearbox 110 that direct the oil to the oil reservoir 122 in order to reduce the amount of oil interacting with the spinning gears 114, 116. In some embodiments, the oil reservoir 122 includes a porous media (e.g. sintered metal device) to operate as a nucleation site of working fluid dissolved in the oil. This is advantageous as it boils dissolved working fluid to prevent the dilution of the oil.

The gearbox 110 also includes an input shaft seal 124 and an output shaft seal 126. The input shaft seal 124 forms an interface that operates as a flow restriction device that restricts movement of oil present in the gearbox assembly 112 into the thermal circuit and restricts movement of working fluid present in the thermal circuit into the gearbox assembly 112. In this way, the input shaft seal 124 it is not a perfect seal. In some embodiments where the gearbox 110 has a reduction ratio between the input shaft 118 and the output shaft 120, the input shaft seal 124 is a high speed input shaft/expander interface and the output shaft seal 126 is a low speed seal. The input shaft seal 124 allows for lubricating any of the moving parts in the gearbox 110. The input shaft seal 124 allows oil from the gearbox 110 to cross the interface of the high speed input shaft seal 124 from the gearbox 110 to the expander 108 and working fluid vapor in the expander 108 to cross the interface the high speed input shaft seal 124 from the expander 108 to the gearbox 110 during various engine operating conditions. For example, the low-side pressure at the energy converter 108 can fluctuate rapidly during engine transients and cause pressure gradients where oil can escape the gearbox 110 and enter the thermal circuit through the input shaft seal 124.

During operation of the WHR system 100, pressure builds in localized points within the gearbox 110 due to heating of the lubrication oil and subsequent vaporization of the working fluid that is contained within the oil. The built-up pressure causes a pressure gradient throughout the gearbox 110. When the pressure of the working fluid vapor is large enough, the working fluid vapor may carry oil droplets from the oil. The working fluid vapor containing oil droplets may exit the gearbox 110 through the input shaft seal 124. This results in the loss of oil in the gearbox 110 and causes oil to enter the working fluid in the thermal circuit. The gearbox 110 includes bearings that rotate with a high rotational speed. The bearings are within close proximity of the input shaft seal 124 and are lubricated by the oil located in the gearbox 110. When the pressure of the gearbox 110 is large enough, a high concentration of oil may exit the gearbox 110 due to the proximity of the bearings to the input shaft seal 124 and the high rotational speed of the bearings.

The WHR system 100 further includes a check valve 128 (e.g., unidirectional valve, one-way valve, etc.). The check valve 128 is fluidly coupled to the gearbox 110 and is configured to receive a suction flow from the gearbox 110 by providing suction (e.g., flow created by a low pressure region). The check valve 128 may be positioned above the gearbox 110 so that oil droplets do not exit by the suction flow through the check valve 128.

The WHR system 100 further includes an ejector 130 (e.g., pressure-exchange ejector, pumping mechanism, screw, eductor, surface jet pumps, Venturi, velocity spools, etc.). The ejector 130 is fluidly coupled to the check valve 128 and is configured to receive the suction flow from the gearbox 110 via the check valve 128. The continuous suction flow provided by the gearbox 110 via the check valve 128 reduces the pressure within the gearbox 110. This is advantageous as it prevents working fluid vapor from carrying oil through the input shaft seal 124.

The ejector 130 receives a small amount of motive flow for the turbine inlet via a motive flow conduit 132. The motive flow conduit 132 is fluidly coupled to the boiler 104 and is configured to receive high-pressure working fluid from the boiler 104.

The ejector 130 includes a nozzle 134 that interfaces with the high-pressure motive flow. The nozzle 134 is configured to convert the pressure energy of the motive flow into kinetic energy. This causes the motive flow to decrease in pressure and to increase in velocity. Due to the conversion of high pressure into high velocity, the area nearest the tip of the nozzle 134 becomes a low-pressure region. This low-pressure region results in a suction chamber 136. The suction chamber 136 creates the suction flow from the gearbox 110 via the check valve 128. In some embodiments, the WHR system 100 utilizes a vacuum pump or centrifuge, to create the suction flow from the gearbox 110.

The ejector 130 also includes a diffuser 138 (e.g., distributer, diluter, etc.). The motive flow and the suction flow travel together through the diffuser 138. While interfacing with the diffuser 138, the motive flow and the suction flow reduce in velocity due to a diverging geometry of the diffuser 138. The pressure of the suction flow increases (e.g., the suction flow is compressed) due to the high pressure of the motive flow. Accordingly, the pressure of the motive flow is decreased (e.g., the motive flow expands). The resulting pressure value of the combined suction flow and motive flow results in being between the initial pressure of the suction flow and the initial pressure of the motive flow. The combined motive flow and suction flow then exit the ejector 130 to an exit flow conduit 140. The combined motive flow and suction flow return to the thermal circuit as an expanded gas vapor via the exit flow conduit 140. In some embodiments, the exit flow conduit 140 includes passive check valves (spring loaded check valve, gravity check valve, etc.) or actuated valves to control the rate of the combined motive flow and suction flow. This is advantageous as it prevents excess flow of working fluid in the thermal circuit.

The WHR system 100 further includes an oil scraper 142 (e.g., oil separator, etc.). The working fluid exiting the expander 108 is an expanding gas vapor. After exiting the expander 108, the working fluid interfaces with the oil scraper 142. If the working fluid does carry oil droplets out of the expander 108, the oil scraper 142 is configured to separate the oil droplets from the working fluid. This is advantageous as it minimizes the amount of oil from accumulating in the working fluid in the thermal circuit. The oil scraper 142 includes a collecting channel, such as a gutter, groove, or obstruction, which collects the oil droplets within the working fluid and provides a channel or path to direct the collected oil to an exit of the oil scraper 142.

The WHR system 100 further includes a scraper drain 144 (e.g., return conduit). The scraper drain 144 is fluidly coupled to the oil scraper 142 and to the oil reservoir 122. The scraper drain 144 is configured to receive oil collected by the oil scraper 142 and return it to the oil reservoir 122.

The scraper drain 144 may include passive check valves or actuated valves. The valves control the return rate of the oil to the oil reservoir 122. This is advantageous as it prevents excess vapor from returning into the gearbox 110 when the oil return flow rate is too high.

The WHR system 100 further includes a condenser 146. The condenser 146 is thermally coupled to a cooling medium, such as a coolant and/or air. After interfacing with the oil scraper 142, the working fluid remains as an expanding gas vapor. The working fluid transfers heat to the cooling medium interfacing with the condenser 146. The cooling medium outputs the heat provided by the working fluid through a cooling medium conduit 148. Due to the heat transfer, the working fluid cools and, accordingly, condenses to a liquid form. The phase transition also results in an increase in density of the working fluid. The working fluid exits the condenser 146 and is now in condition to re-enter the pump 102 to repeat the Rankine cycle.

Figure 2:
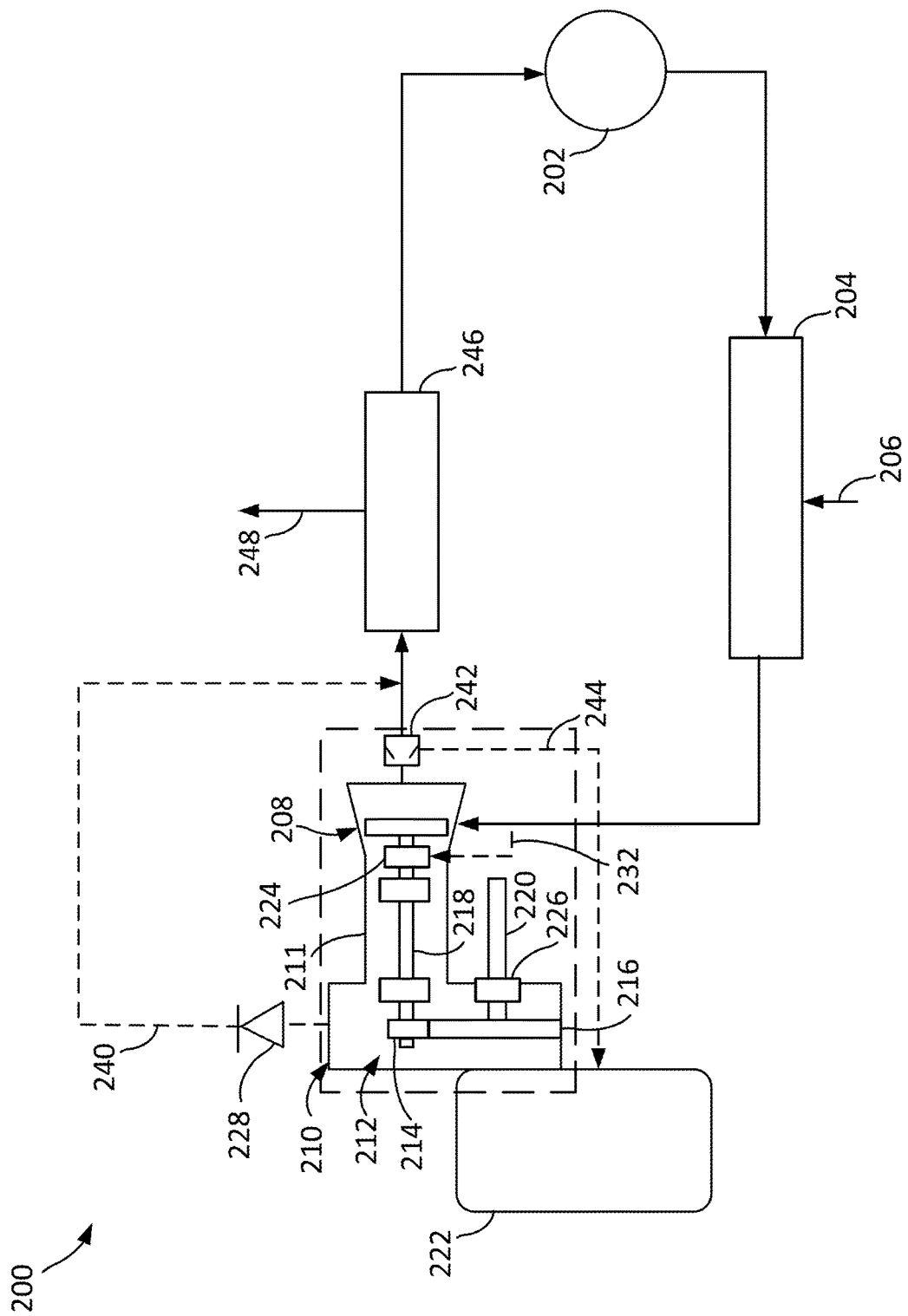
FIG. 2 is a diagram of another example WHR system including pressurized seals.

FIG. 2 is a diagram of an example waste heat recovery (WHR) system 200 including pressurized seals according to an exemplary embodiment. The WHR system 200 includes a Rankine cycle, which can increase the thermal efficiency of an internal combustion engine (e.g., a gasoline or diesel engine system) by utilizing internal combustion exhaust gas heat energy and/or heat energy generated by an exhaust aftertreatment system. More specifically, the WHR system 200 includes a pump 202 (e.g., a feed or liquid pump, etc.) configured to move working fluid through a thermal circuit that includes a boiler 204, an expander 208, which can be a high pressure expander (e.g., a turbine, etc.), and a condenser 246. The pump 202, the boiler, the expander 208, and the condenser 246 are fluidly coupled to one another and are configured to provide working fluid to or receive working fluid from each other to form a Rankine cycle thermal circuit.

The WHR system 200 includes the boiler 204 (e.g., superheater, etc.) that is fluidly coupled to the pump 202 and configured to receive working fluid from the pump 202. The boiler 204 is configured to receive a thermal input 206 from a waste heat source. The thermal input 206 may provide heat via conduction, convection, or radiation. The heat provided by the thermal input 206 is transferred to the working fluid flowing through and/or near the boiler 204. The thermal transfer causes the working fluid to undergo boiling (e.g., rapid vaporization, etc.) and to transition into a high pressure vapor.

The WHR system 200 also includes the expander 208. The expander 208 may be a turbine, piston, scroll, screw, vane, swash plate, or other type of gas expander that moves, (e.g., rotates, as a result of expanding working fluid vapor to provide additional work, etc.). The expander 208 is fluidly coupled to the boiler 204 and is configured to receive high pressure vapor from the boiler 204. The expander 208 converts the energy of the high pressure vapor into another useful form of energy to provide the additional work.

The additional work can be fed into the engine's driveline to supplement the engine's power either mechanically, hydraulically, or electrically (e.g., by turning a generator), or it can be used to drive a generator and power electrical devices, parasitics, or a storage battery. Alternatively, the expander 208 can be used to transfer energy from one system to another system (e.g., to transfer heat energy from the WHR system 200 to another engine system requiring shaft work such as a compressor, alternator, A/C compressor, etc. or to a fluid for a heating system).

In an exemplary embodiment, the expander 208 is integrated into a power transfer system, in the form of a gearbox 210 (e.g., manifold, transmission housing, etc.) in a particular set of embodiments. Power produced by the expander 208 is capable of producing additional work or transferring energy to the gearbox 210. The gearbox 210 includes a gearbox housing 211 (e.g., manifold, encasing, etc.) The gearbox housing 211 defines a cavity to contain oil. The gearbox 210 includes a gearbox assembly 212 (e.g., transmission, etc.). Power that is generated by the expander 108 is mechanically coupled (e.g., integrated, etc.) to the gearbox assembly 212, which in turn is mechanically fed to a driveline (not shown) to supplement engine power and improve fuel economy.

The gearbox assembly 212 includes a first gear 214 and a second gear 216 respectively attached to an input shaft 218 and an output shaft 220, associated bearing assemblies (not shown), and an oil reservoir 222 that is in fluid communication with the gearbox 210. The rotational speed of the output shaft 220 is reduced relative to the rotational speed of the input shaft 218, and the torque at the output shaft 220 is increased relative to the torque at the input shaft 218 in a manner corresponding to a reduction ratio of the gearbox assembly 212. It should be understood that the gearbox assembly 212 can include a different number of gears than what is depicted in the figures herein and a different output to input ratio corresponding to a particular application of the converted power.

In an example embodiment, the oil reservoir 222 is shown as laterally adjacent the gearbox assembly 212. In other embodiments, the oil reservoir 222 can be located in another position. For example, the oil reservoir 222 can be positioned beneath the gearbox 210 so that escaped oil is collected within the oil reservoir 222. The gearbox 210 may also include collectors (e.g. scrapers, etc.) (not shown) positioned on the walls of the gearbox 210 that direct the oil that to the oil reservoir 222 in order to reduce the amount of oil interacting with the spinning gears 214, 216. In some embodiments, the oil reservoir 222 includes a porous media (e.g. sintered metal device) to operate as a nucleation site of working fluid dissolved in the oil. This is advantageous as it boils dissolved working fluid to prevent the dilution of the oil.

The gearbox 210 also includes an input shaft seal 224 and an output shaft seal 226. The input shaft seal 224 forms an interface that operates as a flow restriction device that restricts movement of oil present in the gearbox assembly 212 into the thermal circuit and restricts movement of working fluid present in the thermal circuit into the gearbox assembly 212. In this way, the input shaft seal 224 it is not a perfect seal. In some embodiments where the gearbox 210 has a reduction ratio between the input shaft seal 224 and the output shaft seal 226, the input shaft seal 224 is a high speed input shaft/expander interface and the output shaft seal 226 is a low speed seal. The input shaft seal 224 allows for lubricating any of the moving parts in the gearbox 210. The input shaft seal 224 allows oil from the gearbox 210 to cross the interface of the high speed input shaft seal 224 from the gearbox 210 to the expander 208, and working fluid vapor in expander 208 to cross the interface the high speed input shaft seal 224 from expander 208 to gearbox 210 during various engine operating conditions. For example, the low-side pressure at the energy converter 108 can fluctuate rapidly during engine transients and cause pressure gradients where oil can escape the gearbox 210 and enter the thermal circuit through the input shaft seal 124.

During operation of the WEIR system 200, pressure builds in localized points within the gearbox 210 due to heating of the lubrication oil and subsequent vaporization of the working fluid that is contained within the oil. The built-up pressure causes a pressure gradient throughout the gearbox 210. When the pressure of the working fluid vapor is large enough, the working fluid vapor may carry oil droplets from the oil in the gearbox 210. The working fluid vapor containing oil droplets may exit the gearbox 210 through the input shaft seal 224. This results in the loss of oil in the gearbox 210 and causes oil to enter the working fluid in the thermal circuit. The gearbox 210 includes bearings that rotate with a high rotational speed. The bearings are within close proximity of the input shaft seal 224 and are lubricated by the oil located in the gearbox 210. When the pressure of the gearbox 210 is large enough, a high concentration of oil may exit the gearbox 210 due to the proximity of the bearings to the input shaft seal 224 and the high rotational speed of the bearings.

The expander 208 receives a high-pressure vapor flow for the turbine inlet via a vapor flow conduit 232. The vapor flow conduit 232 is fluidly coupled to the boiler 204 and is configured to receive high-pressure working fluid from the boiler 204. The vapor flow conduit 232 provides the high-pressure vapor flow proximate to the input shaft seal 224. The high-pressure vapor creates a pressurized seal area (e.g., barrier, barricade) surrounding the input shaft seal 224. This pressurized seal area prevents oil droplets from exiting the gearbox 210 via the input shaft seal 224.

The WHR system 200 further includes a check valve 228 (e.g., unidirectional valve, one-way valve, etc.). The check valve 228 is fluidly coupled to the gearbox 210 and is configured to receive a suction flow from the gearbox 210 by providing suction (e.g., flow created by a low pressure region). The check valve 228 may be positioned above the gearbox 210 so that oil droplets do not exit by the suction flow through the check valve 228. By receiving a suction flow from the gearbox 210, the pressure in the gearbox 210 can be relieved. This is advantageous as it prevents working fluid vapor from carrying oil through the input shaft seal 224. The suction flow returns to the thermal circuit as an expanded gas vapor via an exit flow conduit 240. In some embodiments, the exit flow conduit 240 includes passive check valves (spring loaded check valve, gravity check valve, etc.) or actuated valves to control the rate of the suction flow. This is advantageous as it prevents excess flow of working fluid in the thermal circuit.

The WHR system 100 further includes an oil scraper 242 (e.g., oil separator). The working fluid exiting the expander 208 is an expanding gas vapor. After exiting the expander 208, the working fluid interfaces with the oil scraper 242. If the working fluid does carry oil droplets out of the expander 208, the oil scraper 242 is configured to separate the oil droplets from the working fluid. This is advantageous as it minimizes the amount of oil from accumulating in the working fluid in the thermal circuit. The oil scraper 242 includes a collecting channel such as a gutter, groove or obstruction that collects the oil droplets within the working fluid and provides a channel or path to direct the collected oil to an exit of the oil scraper 242. The oil scraper 242 also include a membrane impactor (e.g., diverging cone, elliptical section, etc.) (not shown) to drive the oil before being collected.

The WHR system 200 further includes a scraper drain 244 (e.g., return conduit). The scraper drain 244 is fluidly coupled to the oil scraper 242 and to the oil reservoir 222. The scraper drain 244 is configured to receive oil collected by the oil scraper 242 and return it to the oil reservoir 222. The scraper drain 244 may include passive check valves or actuated valves. The valves control the return of the oil to the oil reservoir 222. This is advantageous as it prevents excess vapor from returning into the gearbox 210 when the oil return flow rate is too high.

The WHR system 200 further includes the condenser 246. The condenser 246 is thermally coupled to a cooling medium such as a coolant and/or air. After interfacing with the oil scraper 242, the working fluid remains as an expanding gas vapor. The working fluid transfers heat to the cooling medium interfacing with the condenser 246. The cooling medium outputs the heat provided by the working fluid through a cooling medium conduit 248. Due to the heat transfer, the working fluid cools and, accordingly, condenses to a liquid form. The phase transition also results in an increase in density of the working fluid. The working fluid exits the condenser 246 and is now in condition to re-enter the pump 202 to repeat the Rankine cycle.

Figure 3:
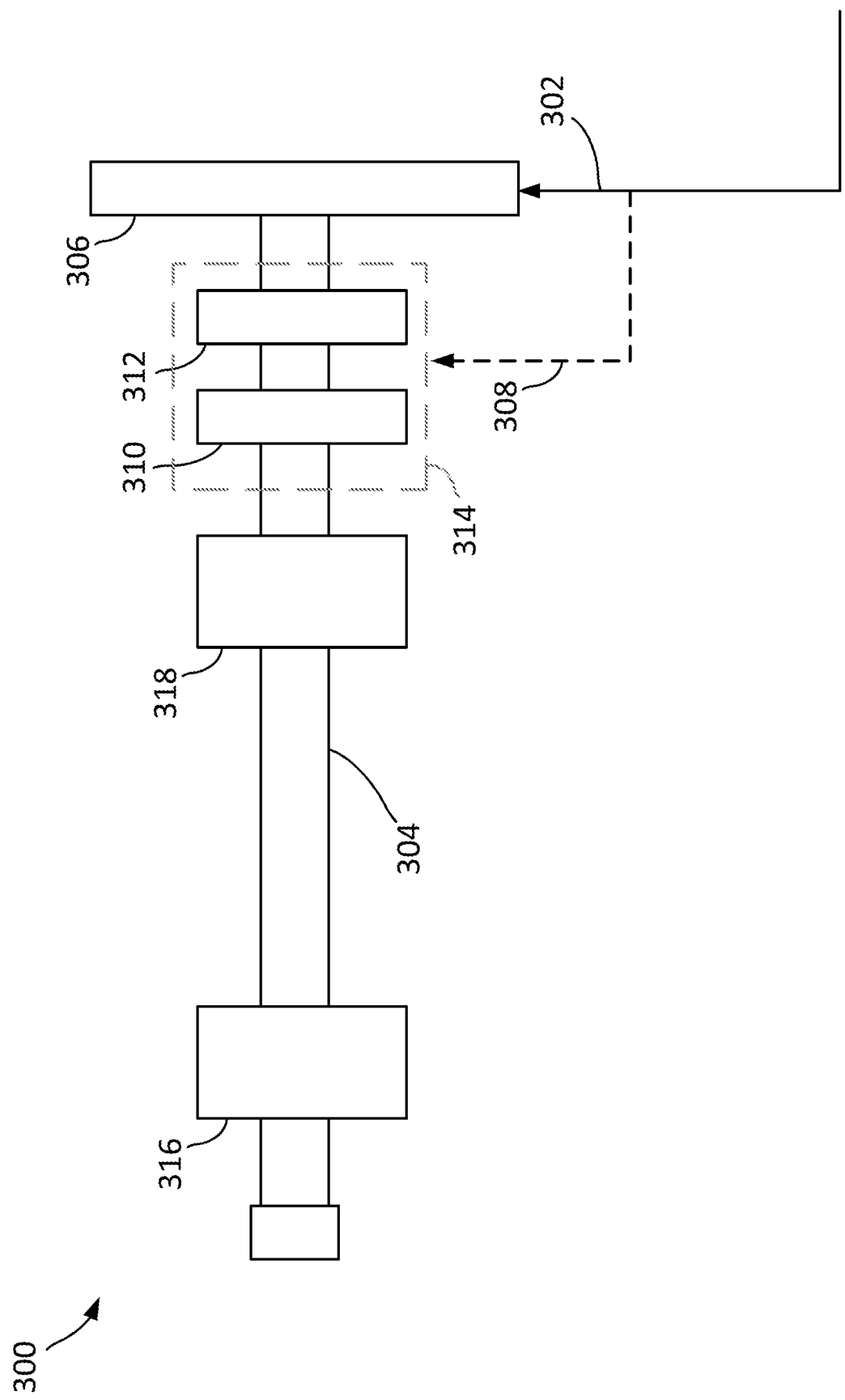
FIG. 3 is a diagram of an example expander for use in the WHR system of FIG. 2.

FIG. 3 is a diagram of an example high-pressure expander, such as the turbine 300, for use in the WHR system 200 of FIG. 2. The turbine 300 includes a turbine inlet conduit 302. The turbine inlet conduit 302 is fluidly coupled to a boiler (such as boiler 204) and is configured to receive working fluid in a high-pressure vapor form. The turbine 300 further includes an input shaft 304. Work produced by the turbine 300 is transferred to the input shaft 304. The turbine 300 further includes a turbine wheel 306 disposed on the turbine shaft 304. The turbine wheel 306 receives the working fluid in high-pressure vapor form and rotates due to the transfer of kinetic energy, which in turn rotates the input shaft 304. This rotation creates mechanical work to be used by the WHR system 200.

The turbine 300 further includes a vapor flow conduit 308. The vapor flow conduit 308 diverges from the turbine inlet conduit 302 prior to the working fluid being received by the turbine wheel 306. The vapor flow conduit 308 is fluidly coupled to the boiler and is configured to receive high-pressure working fluid from the boiler.

The turbine 300 further includes a first high-speed shaft seal 310 and a second high-speed shaft seal 312 positioned on the input shaft 304. The first high-speed shaft seal 310 and the second high-speed shaft seal 312 form an interface that operates as a flow restriction device that restricts movement of oil present in the turbine 300 in the thermal circuit and restricts movement of working fluid present in the thermal circuit into the turbine 300. In this way, the first high-speed shaft seal 310 and the second high-speed shaft seal 312 are not perfect seals. The vapor flow conduit 308 provides the high-pressure vapor flow proximate to the first high-speed shaft seal 310 and the second high-speed shaft seal 312. This creates a pressurized seal area 314 (e.g., barrier, barricade) surrounding the first high-speed shaft seal 310 and the second high-speed shaft seal 312. The pressurized seal area 314 prevents oil droplets from exiting the turbine 300 through the first high-speed shaft seal 310 and/or the second high-speed shaft seal 312 as the oil droplets are unable to penetrate the pressurized seal area 314.

The turbine 300 further includes a first bearing 316 and a second bearing 318 positioned on the input shaft 304. Both the first bearing 316 and the second bearing 318 rotate at a high rotational speed and are within close proximity of the first high-speed shaft seal 310 and the second high-speed shaft seal 312. The first bearing 316 and the second bearing 318 are lubricated by the oil in in the turbine 300. When the pressure of the turbine 300 reaches a high enough pressure, a high concentration of oil may exit the turbine 300 through the first high-speed shaft seal 310 and/or the second high-speed shaft seal 312 due to their proximity to the first bearing 316 and a second bearing 318 and the high rotational speed of the bearings 316, 318. The pressurized seal area 314 acts as a partition that allows working fluid vapor to pass through the pressurized seal area 314 while preventing oil droplets (such as oil droplets expelled by the rotation of the bearings) from exiting the turbine 300 through the first high-speed shaft seal 310 and the second high-speed shaft seal 312.

Figure 4:
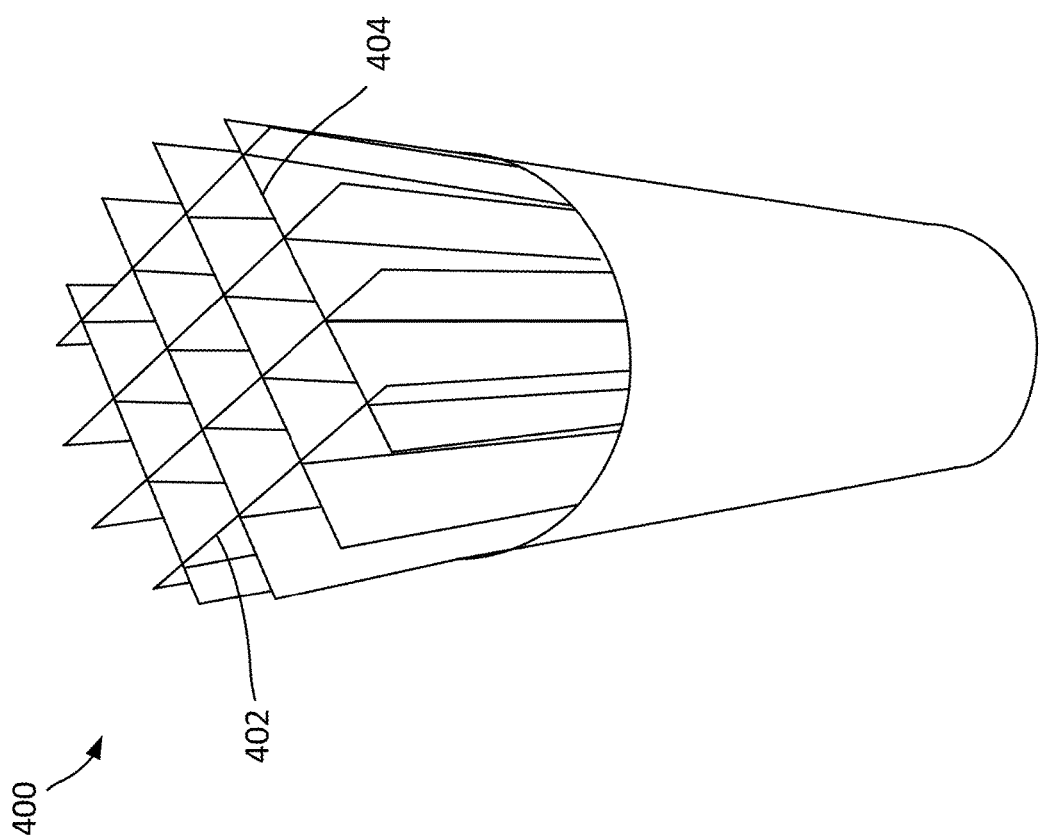
FIG. 4 is a diagram of an example flow straightener for use in the WHR systems of FIGS. 1 and 2.

FIG. 4 is a diagram of an example flow straightener 400 for use in a WHR system (such as WHR systems 100, 200 of FIGS. 1 and 2). The flow straightener 400 is positioned between an outlet of an expander (e.g., expander 108 or expander 208) and an oil scraper (e.g., oil scraper 142 or oil scraper 242). The flow straightener 400 includes a plurality of vertical plates 402 (e.g., channels) and a plurality of horizontal plates 404 (e.g., channels). The plurality of vertical plates 402 and the plurality of horizontal plates 404 define apertures that the working fluid to travel through. Working fluid exiting the expander typically may have a turbulent flow causing swirls and/or eddy currents. This turbulent flow decreases the effectiveness of the oil scraper from entraining oil. Accordingly, the plurality of vertical plates 402 and the plurality of horizontal plates 404 of the flow straightener 400 cause the working fluid to have a more laminar flow. This is advantageous as it allows for the oil scraper to entrain more oil from the working fluid. In some embodiments, the flow straightener 400 defines equally sized or differently sized apertures. In some embodiments, the apertures are square, rectangular, or circular.

In some embodiments, the flow straightener 400 includes a metal mesh (e.g. gauze). The working fluid interfaces with apertures defined by the metal mesh, which results in the flow having a more laminar profile. In other embodiments, the flow straightener 400 consists of a plurality of tubes in parallel. The working fluid is divided into the plurality of tubes, which results in the flow having a more laminar profile. The laminar working fluid is then rejoined at the exit of the flow straightener 400.

Figure 5:
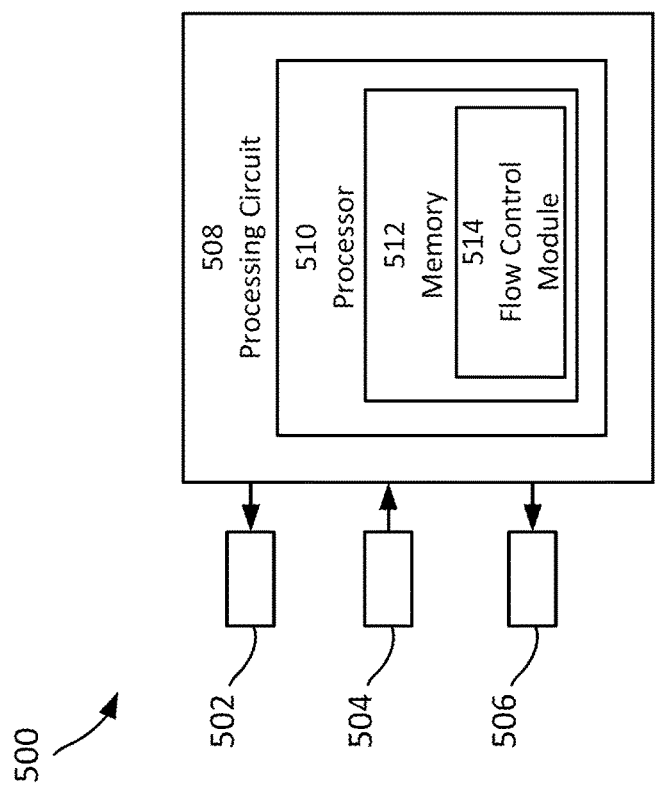
FIG. 5 is a block schematic of an example controller for use in the WHR systems of FIGS. 1 and 2.

FIG. 5 is a block schematic of an example controller 500 for use in a WHR system (such as the WHR systems 100, 200 of FIGS. 1 and 2). The WHR system is electrically or communicatively coupled to the controller 500. The controller 500 may be configured to control the flow of the working fluid in the thermal circuit through a flow actuator. In these embodiments, the controller 500 provides a control signal 502 to the flow actuator to increase or decrease the flow of the working fluid based on the mechanical work required.

The controller 500 may be further configured to receive a signal from a pressure sensor 504 from a gearbox (such as the gearboxes 110, 210 of FIGS. 1 and 2) indicating the pressure in the gearbox. In these embodiments, when the pressure sensor 504 indicates the pressure in the gearbox reaches a pressure threshold, the controller 500 provides a motive flow control signal 506 to the flow actuator to provide additional motive flow to the gearbox or to the ejector to decrease the amount of oil droplets escaping the gearbox.

The controller 500 also includes a processing circuit 508. The processing circuit 508 includes a processor 510 and a memory 512. The processor 510 may include a microprocessor, an application-specific integrated circuit (ASIC), a field-programmable gate array (FPGA), etc., or combinations thereof. The memory 512 may include, but is not limited to, electronic, optical, magnetic, or any other storage or transmission device capable of providing a processor, ASIC, FPGA, etc. with program instructions. This memory 512 may include a memory chip, Electrically Erasable Programmable Read-Only Memory (EEPROM), Erasable Programmable Read Only Memory (EPROM), flash memory, or any other suitable memory from which the controller 500 can read instructions. The instructions may include code from any suitable programming language. The memory 512 may include various modules that include instructions which are configured to be implemented by the processor 510.

The memory 512 includes a flow control module 514 (e.g., circuit, etc.). The flow control module 514 is configured to facilitate interaction between the controller 500 and the WHR system. The flow control module 514 is further configured to determine adjustments to the flow of the working fluid and/or to the motive flow. The flow control module 514 provides the control signal 502 to the WHR system based on the mechanical work requirements of the WHR system. The flow control module 514 also receives a pressure value from the pressure sensor 504 indicating the pressure value in the gearbox. The flow control module 514 then controls the amount of motive flow by providing the motive flow control signal 506.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, fuel, an gaseous fuel-air mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A waste heat recovery system, comprising:
   a thermal circuit configured to convert thermal energy into mechanical energy, the thermal circuit comprising:
     a boiler;
     an expander fluidly coupled to the boiler and configured to receive working fluid from the boiler, the expander comprising:
       a turbine wheel;
       a bearing; and
       a first input shaft seal and a second input shaft seal positioned between the turbine wheel and the bearing;
     a power transfer system integrated to the expander, the power transfer system configured to receive mechanical energy from the expander, the power transfer system having an interface configured to restrict movement of oil present in the power transfer system into the thermal circuit; and
     a vapor flow conduit fluidly coupled to the boiler and defining a pressurized seal area surrounding the first input shaft seal and the second input shaft seal and proximate to the interface, the vapor flow conduit configured to receive high-pressure vapor working fluid from the boiler and provide the high-pressure vapor working fluid proximate to the interface.

2. The waste heat recovery system of claim 1, wherein the power transfer system is mechanically coupled to the expander, thereby causing the power transfer system to provide a power output.

3. The waste heat recovery system of claim 1, wherein the vapor flow conduit defining the pressurized seal area proximate to the interface thereby reduces oil disposed in a housing of the power transfer system from exiting the housing through the interface.

4. The waste heat recovery system of claim 1, wherein the power transfer system is a gearbox assembly.

5. The waste heat recovery system of claim 4, wherein the first input shaft seal and the second input shaft seal are positioned on a gearbox input shaft and allow for lubrication of the gearbox assembly and for oil from the gearbox assembly to cross to the expander and for working fluid vapor to cross from the expander to the gearbox assembly.

6. The waste heat recovery system of claim 1, further comprising a check valve fluidly coupled to the power transfer system, the check valve configured to receive a suction flow of working fluid from the power transfer system and to provide the suction flow of working fluid to the thermal circuit, thereby reducing pressure in the power transfer system.

7. The waste heat recovery system of claim 6, wherein the suction flow of working fluid is returned to the thermal circuit via an exit flow conduit, the exit flow conduit including valves that control the rate of suction flow of working fluid.

8. The waste heat recovery system of claim 1, further comprising:
  an oil reservoir fluidly coupled to the power transfer system, the oil reservoir configured to store oil for the power transfer system and to provide oil to the power transfer system; and
  an oil scraper fluidly coupled to the power transfer system, the oil scraper configured to collect oil that has exited the expander and to provide collected oil to the oil reservoir.

9. The waste heat recovery system of claim 8, further comprising a flow straightener fluidly coupled to the expander and fluidly coupled to the oil scraper, the flow straightener configured to cause working fluid and oil that has exited the expander to define a laminar profile before entering the oil scraper.

10. The waste heat recovery system of claim 1, wherein the boiler receives a thermal input from a waste heat source, wherein the thermal input heats the working fluid flowing through the boiler.

11. The waste heat recovery system of claim 10, wherein the waste heat source is selected from a group consisting of coolant, charge air, oil, aftertreatment exhaust, an exhaust gas recirculation system, and a thermal energy recuperator.

12. The waste heat recovery system of claim 1, wherein the thermal circuit is a Rankine Cycle thermal circuit, and wherein the expander is a turbine.

13. The waste heat recovery system of claim 12, wherein the turbine includes a turbine inlet conduit fluidly coupled to the boiler, the turbine inlet conduit receives working fluid in high-pressure vapor form from the boiler.

14. The waste heat recovery system of claim 12, wherein the Rankine Cycle thermal circuit further comprises:
  a pump fluidly coupled to the boiler and configured to provide working fluid to the boiler; and
  a condenser fluidly coupled to the expander and fluidly coupled to the pump, the condenser configured to receive working fluid from the expander and to provide working fluid to the pump.

15. The waste heat recovery system of claim 14, wherein the condenser is thermally coupled to a cooling medium, the cooling medium outputs heat provided by the working fluid from the pump, cooling the working fluid, and wherein the condenser returns the working fluid to the pump.

16. The waste heat recovery system of claim 15, wherein cooling the working fluid includes condensing the working fluid from a gas vapor to a liquid form, thereby increasing the density of the working fluid.

17. A waste heat recovery system, comprising:
  a thermal circuit configured to convert thermal energy into mechanical energy, the thermal circuit comprising:
    a boiler;
    an expander fluidly coupled to the boiler and configured to receive working fluid from the boiler;
    a power transfer system integrated to the expander, the power transfer system configured to receive mechanical energy from the expander, the power transfer system having an interface configured to restrict movement of oil present in the power transfer system into the thermal circuit; and
    a vapor flow conduit fluidly coupled to the boiler and configured to receive high-pressure vapor working fluid from the boiler, the vapor flow conduit configured to provide the high-pressure vapor working fluid proximate to the interface; and
  a check valve fluidly coupled to the power transfer system, the check valve configured to receive a suction flow of working fluid from the power transfer system and to provide the suction flow of working fluid to the thermal circuit, thereby reducing pressure in the power transfer system,
  wherein an ejector is fluidly coupled to the check valve and the power transfer system, the ejector receiving the suction flow from the power transfer system via the check valve and receives motive flow from the power transfer system, the ejector comprising a diffuser that combines the suction flow and the motive flow, increasing the pressure of the suction flow and decreasing the pressure of the motive flow, and wherein the combined suction flow and motive flow exit to the thermal circuit via an exit flow conduit of the ejector.

18. A waste heat recovery system, comprising:
  a thermal circuit configured to convert thermal energy into mechanical energy, the thermal circuit comprising:
    a boiler;
    an expander fluidly coupled to the boiler and configured to receive working fluid from the boiler;
    a power transfer system integrated to the expander, the power transfer system configured to receive mechanical energy from the expander, the power transfer system having an interface configured to restrict movement of oil present in the power transfer system into the thermal circuit; and
    a vapor flow conduit fluidly coupled to the boiler and configured to receive high-pressure vapor working fluid from the boiler, the vapor flow conduit configured to provide the high-pressure vapor working fluid proximate to the interface;
  an oil reservoir fluidly coupled to the power transfer system, the oil reservoir configured to store oil for the power transfer system and to provide oil to the power transfer system;
  an oil scraper fluidly coupled to the power transfer system, the oil scraper configured to collect oil that has exited the expander and to provide collected oil to the oil reservoir; and
  a flow straightener fluidly coupled to the expander and fluidly coupled to the oil scraper, the flow straightener configured to cause working fluid and oil that has exited the expander to define a laminar profile before entering the oil scraper,
  wherein the flow straightener includes a plurality of vertical plates and a plurality of horizontal plates, the plurality of vertical plates and the plurality of horizontal plates defining apertures through which the working fluid travels.

19. A waste heat recovery system, comprising:
  a thermal circuit configured to convert thermal energy into mechanical energy, the thermal circuit comprising:

a boiler;
an expander fluidly coupled to the boiler and configured to receive working fluid from the boiler;
a power transfer system integrated to the expander, the power transfer system configured to receive mechanical energy from the expander, the power transfer system having an interface configured to restrict movement of oil present in the power transfer system into the thermal circuit; and
a vapor flow conduit fluidly coupled to the boiler and configured to receive high-pressure vapor working fluid from the boiler, the vapor flow conduit configured to provide the high-pressure vapor working fluid proximate to the interface;
an oil reservoir fluidly coupled to the power transfer system, the oil reservoir configured to store oil for the power transfer system and to provide oil to the power transfer system;
an oil scraper fluidly coupled to the power transfer system, the oil scraper configured to collect oil that has exited the expander and to provide collected oil to the oil reservoir; and
a flow straightener fluidly coupled to the expander and fluidly coupled to the oil scraper, the flow straightener configured to cause working fluid and oil that has exited the expander to define a laminar profile before entering the oil scraper,
wherein the flow straightener includes a mesh, the mesh causing the working fluid and oil to have the laminar profile before entering the oil scraper.

20. A waste heat recovery system, comprising:
a thermal circuit configured to convert thermal energy into mechanical energy, the thermal circuit comprising:
a boiler;
an expander fluidly coupled to the boiler and configured to receive working fluid from the boiler;
a power transfer system integrated to the expander, the power transfer system configured to receive mechanical energy from the expander, the power transfer system having an interface configured to restrict movement of oil present in the power transfer system into the thermal circuit; and
a vapor flow conduit fluidly coupled to the boiler and configured to receive high-pressure vapor working fluid from the boiler, the vapor flow conduit configured to provide the high-pressure vapor working fluid proximate to the interface;
an oil reservoir fluidly coupled to the power transfer system, the oil reservoir configured to store oil for the power transfer system and to provide oil to the power transfer system;
an oil scraper fluidly coupled to the power transfer system, the oil scraper configured to collect oil that has exited the expander and to provide collected oil to the oil reservoir; and
a flow straightener fluidly coupled to the expander and fluidly coupled to the oil scraper, the flow straightener configured to cause working fluid and oil that has exited the expander to define a laminar profile before entering the oil scraper,
wherein the flow straightener includes a plurality of tubes arranged in parallel to each other, the plurality of tubes causing the working fluid and oil to have the laminar profile before entering the oil scraper.

\* \* \* \* \*